United States Patent
Watanabe et al.

(10) Patent No.: US 6,898,502 B2
(45) Date of Patent: May 24, 2005

(54) SYSTEM FOR CHANGING FUNCTION OF WORK MACHINE AND BASE STATION

(75) Inventors: Hiroshi Watanabe, Ushiku (JP); Koichi Shibata, Ibaraki (JP); Hiroyuki Adachi, Tsuchiura (JP); Toichi Hirata, Ushiku (JP); Genroku Sugiyama, Ryugasaki (JP); Hideki Komatsu, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 126 days.

(21) Appl. No.: 10/240,398

(22) PCT Filed: Mar. 30, 2001

(86) PCT No.: PCT/JP01/02781

§ 371 (c)(1),
(2), (4) Date: Sep. 30, 2002

(87) PCT Pub. No.: WO01/73218

PCT Pub. Date: Oct. 4, 2001

(65) Prior Publication Data

US 2003/0144750 A1 Jul. 31, 2003

(30) Foreign Application Priority Data

Mar. 31, 2000 (JP) ........................................ 2000-100018

(51) Int. Cl.⁷ ............................. G06F 19/00; G07C 5/00
(52) U.S. Cl. ............................................. 701/50; 172/75
(58) Field of Search ...................... 701/36, 50; 172/75; 37/414–415

(56) References Cited

U.S. PATENT DOCUMENTS 6,084,870 A * 7/2000 Wooten et al. ............... 370/349

FOREIGN PATENT DOCUMENTS

| EP | 860557 A1 | 8/1998 |
|---|---|---|
| EP | 989525 A2 | 3/2000 |
| JP | 6-020127 | 1/1994 |
| JP | 7-166582 | 6/1995 |
| JP | 11-303149 | 11/1999 |
| JP | 2000-160602 | 6/2000 |

* cited by examiner

Primary Examiner—Thu V. Nguyen
(74) Attorney, Agent, or Firm—Mattingly, Stanger, Malur & Brundidge, P.C.

(57) ABSTRACT

A function changing system of construction machinery includes a hydraulic excavator and a base station. The hydraulic excavator is deployed at a construction site and is provided with a rewritable memory storing control programs and/or data required for control of the machinery, a CPU for reading out the control programs from the memory and executing them, and a communications device The base station is provided with a communications device, a center server for identifying the serial number of the hydraulic excavator and transferring information with the control unit, and a database managed by the center server and storing control programs corresponding to the hydraulic excavator. When changing or switching an attachment of the hydraulic excavator, information is transferred with the center server of the base station and the control programs or data stored in the storage unit are rewritten to enable work suited to the changed part.

11 Claims, 8 Drawing Sheets

38 WORKING MECHANISM

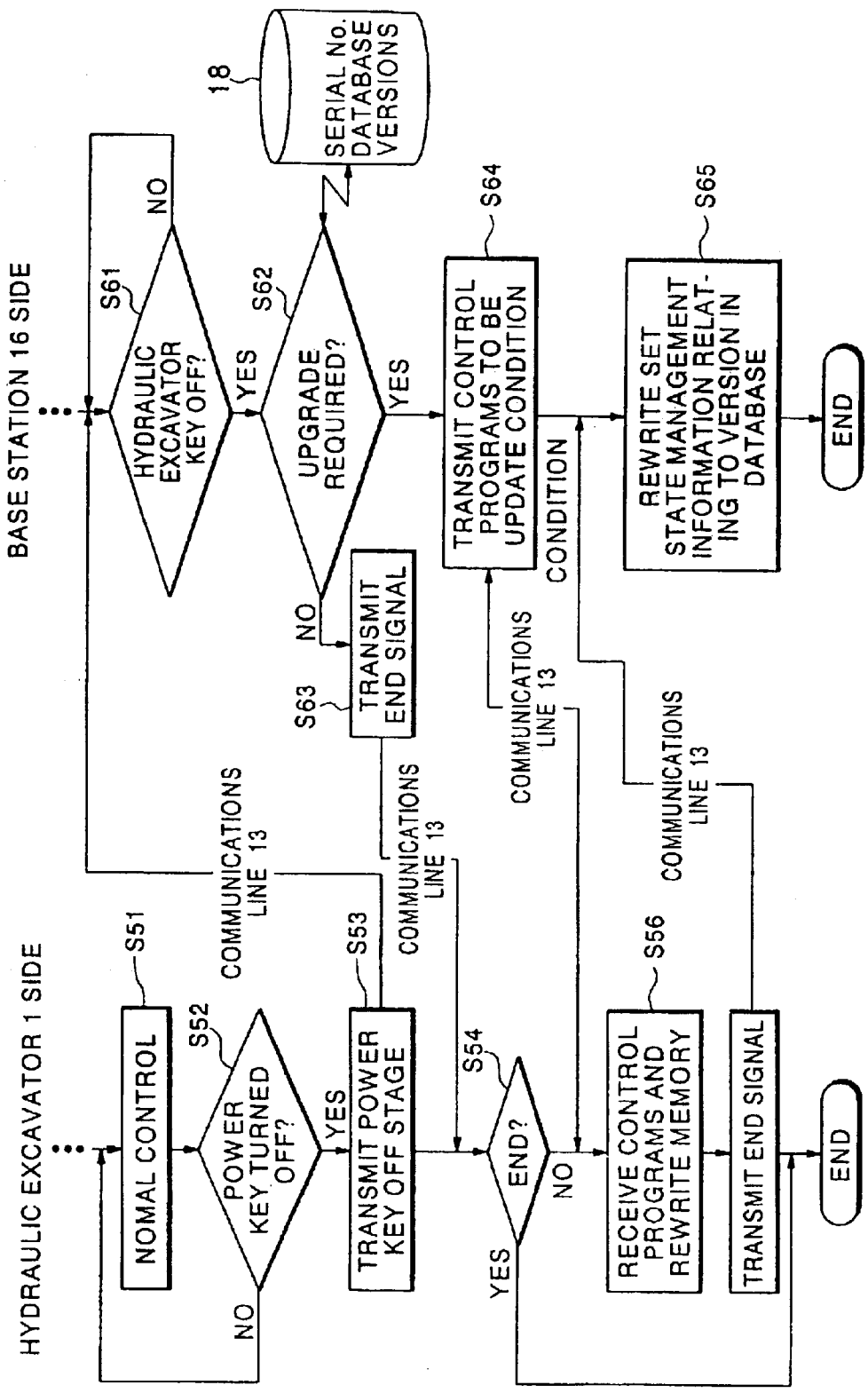

SYSTEM FOR CHANGING FUNCTION OF WORK MACHINE AND BASE STATION

TECHNICAL FIELD

The present invention relates to a function changing system of working machinery and a base station. More particularly, it relates to a function changing system of working machinery capable of rewriting control programs or data stored in storage units by information sent from a center server of the base station prepared by a company manufacturing the machinery or another company relating to the machinery and thereby enabling work suited to changed parts, when changing fronts or attachments etc. of construction machines such as hydraulic excavators. Further, it relates to a base station for managing a large number of working machinery.

BACKGROUND ART

As references disclosing conventional machinery, there are Japanese Unexamined Patent Publication (Kokai) No. 7-166582 and Japanese Unexamined Patent Publication (Kokai) No. 6-20127.

Japanese Unexamined Patent Publication (Kokai) No. 7-166582 discloses a maintenance system for machinery (or management system). This maintenance system is configured to operate as follows: When trouble occurs in machinery, if the operator informs a management section at a distant location of the trouble, the management section side instructs the operator to operate the machinery. When the machinery is operated, a receiving means of the management section collects operating state data obtained by that operation using a communications line and stores it in a received data storage unit. The stored operating state data is studied. In accordance with the findings of the study, a data rewriting means of the management section rewrites the related data stored in the storage unit of the machinery through the management section side transmitting/receiving means and machinery side transmitting/receiving means. Further, when the management section is provided with an operation instructing means, it causes the machinery to perform the necessary operation by a drive instructing means based on the content notified by the operator. Based on this operation, the above operating state data required for adjustment is collected.

Japanese Unexamined Patent Publication (Kokai) No. 6-20127 discloses a control system for construction machines. This control system provides a plurality of outside IC cards for control devices mounted in the construction machines. These IC cards store inspection programs, troubleshooting programs, etc. normally not used. Each IC card is set in a control device as required. The programs stored in the set IC card are then read into and executed by the CPU of the control device to realize the required functions.

In the above conventional machinery maintenance system, when trouble occurs in machinery, a communications line is used to send operating state data of the machinery from the machinery side to the management section side, the trouble is analyzed at the management section, data for eliminating the trouble is sent from the management section to the machinery, and data stored in the storage unit of the machinery is rewritten by the sent data. Therefore, there is the advantage that the machinery maintenance system can perform efficient maintenance without sending a maintenance worker to the site of the machinery.

On the other hand, in the control devices mounted in construction machines, the amount of programs stored in the storage units has been increasing due to the recent increased sophistication of control and the need to realize more diverse functions or a greater number of functions and therefore the storage units built into the control devices have been required to offer greater capacities. Some of these functions are not normally required such as with inspection functions and troubleshooting functions.

Therefore, in the above conventional control system of construction machines, the not normally required functions are separately prepared by IC cards. Due to this, in accordance with need, an IC card is set to install and use programs so as to reduce the used capacity of the storage unit and realize diverse functions.

On the other hand, recently, in machinery such as hydraulic excavators, use of IT (information technology) is being studied in relation to the advances in intelligent machinery through the mounting of high performance computers and the storage of sophisticated function programs and user demands for the users to be able to freely change work. IT is expected to enable greater flexibility enabling user demands to be sufficiently handled, management of high performance machinery by the collection and transfer of data at manufacturers producing machinery or related companies, troubleshooting and individual maintenance of individual machinery, and the provision and proposal of sophisticated services to the users.

Under this situation, neither of the above two conventional systems is able to sufficiently handle the needs. Construction of a more sophisticated system actively using IT is therefore desired.

In particular, in hydraulic excavators, when changing the fronts or attachments to change the functions used, it is desired to transfer data through communications lines to quickly rewrite the control programs or data stored in storage units provided in the machinery to be able to handle the newly attached fronts etc. and therefore enable immediate work suited to the changed parts.

Further, in the actual use of hydraulic excavators, it is necessary to upgrade the programs and change the settings of the parameters. In such a case, in the past, a service worker had to go to the excavator at the construction site bringing floppy disks and rewrite the programs for every each machine. This is extremely troublesome and, including also personnel costs, very costly.

An object of the present invention is to provide a function changing system of machinery designed, in consideration of the above problems, so that a construction machine such as a hydraulic excavator can transfer information with a center server of a base station to rewrite control programs or data stored in its storage unit when for example changing a front, attachment, etc. and thereby perform work suited to the changed part.

Another object of the present invention is to provide a function changing system of machinery enabling simple change of programs or data for upgrading or other change of settings of parameters without trouble and enabling settings of a large number of hydraulic excavators to be simultaneously, efficiently changed.

Still another object of the present invention is to provide a base station for managing a large number of machinery deployed at construction sites at distant locations and transferring control programs and data individually or all together with these machinery.

DISCLOSURE OF INVENTION

The function changing system of machinery and base station according to the present invention are configured as follows to achieve the above objects.

A function changing system of machinery is configured by machinery and a base station. The machinery is machinery such as a hydraulic excavator deployed at a construction site or its vicinity. The machinery is provided with a rewritable storage unit storing control programs and/or data required for control of the work operation, a control unit for calling up the control programs and/or data from the storage unit to execute the work operation, and a communications device (first communications device) enabling communication with an outside unit located at a distant location. The base station is provided with a communications device (second communications device) enabling communication with the communications device of the machinery, a center server for identifying a serial number of the machinery and transferring information with the control unit (hereinafter referred to as a "management server"), and a database managed by that management server and storing basic control programs and data for each model of machinery and control programs and data for operation of the machinery.

The control unit of each machinery and the management server of the base station are respectively configured to be able to transfer information by two-way communication or one-way communication through the above communications devices and a communications line. When part of machinery is changed, the content of the change is given to the control unit and sent by the control unit to the management server of the base station. When receiving the content of the change, the management server transmits the control programs and/or data corresponding to the content of the change to the control unit of the machinery. When the control unit of the machinery receives the control programs and/or data in accordance with this, the stored content of the storage unit is rewritten by the received content.

According to the above function changing system, when changing part of a hydraulic excavator etc., for example, when changing the working mechanism of the machinery, that is, the front, attachment, etc., if the content of the change is notified to the management server of the base station using a communications line etc., in accordance with need, a control programs or control parameters, constants, or other data corresponding to the content of the change stored in the database are returned from the management server side to the hydraulic excavator etc. using a communications line. The control unit of the hydraulic excavator etc. rewrites the original control programs etc. in the storage unit with the control programs etc. returned from the management server. In this way, in this hydraulic excavator etc., control programs etc. corresponding to the changed new working mechanism and work parts are loaded and work can be immediately handled.

In the above configuration, preferably the database of the base station stores standard basic control programs and data for each model.

Further, in the above configurations, a large number of the machinery are deployed at different sites and the database of the base station stores standard control programs and data for each serial number of all of serial numbers of the machinery.

In the above configuration, when a nonstandard attachment is mounted for a partial change of the machinery, dimensional data of the attachment is sent from the machinery side to the management server side. The management server is basically provided with a processor unit. When receiving the dimensional data, the processor unit uses the dimensional data to compute and prepare parameter data and sends that parameter data to the control unit of the machinery. When receiving the parameter data, the control unit rewrites the stored content of the storage unit with the received content.

In the above configuration, change of part of the machinery is a change of the control programs stored in the storage unit. Preferably, this is performed when turning off the power of the machinery. That is, it is performed in the state with the operation of the machinery stopped. Time-wise, it is preferably performed at night.

In the above configurations, preferably a key pad is used as the input means when giving the content of the change to the control unit of the machinery. The key pad is operated to input the data by the on-site operator.

The function changing system of machinery according to another aspect of the invention is comprised of machinery and a base station having equivalent configurations and functions as those explained in the above-mentioned first basic configuration. The control unit of each machinery and the management server of the base station are configured so as to be able to transfer information based on two-way communication through the communications devices and a communications line. When it is necessary to change the control programs and/or data stored in the storage unit of machinery, the management server sends the control programs and/or data to be changed to the control unit of the machinery. When receiving the control programs and/or data, the control unit rewrites the stored content of the storage unit with the received content.

In the above, the relationship between the control unit of the machinery and the management server of the base station can be configured so that communication is possible in a one-way mode from the management server to the control unit of the machinery.

This rewriting of stored content is preferably performed conditional on receipt of a confirmation signal.

The base station according to the present invention is a base station for managing individually or all together the work capabilities of a large number of machinery deployed at different construction sites. This base station is provided with a communications device for communicating with the communications device provided at each of the large number of machinery, a center server for identifying the serial number of each of the large number of machinery and transferring information with the control unit of the machinery through the communications device, and a database managed by the center server and storing basic control programs and data for each model of the machinery and control programs and data for operating the machinery.

The above base station is typically constructed by the manufacturer of the machinery.

In the above configuration, the database stores standard basic control programs and data for each model. Further, the database stores the standard control programs and data for each serial number for all serial numbers of the large number of machinery.

In the above configuration, the center server receives transmission of a signal relating to a partial change from machinery, prepares parameter data suitable for the changed portion, and transmits that parameter data to the control unit of the machinery.

Further, in the above configuration, for a program upgrade or change of the parameters for control relating to the work capability of machinery, the control programs and data required for the control unit of the machinery are sent from the center server by a one-way communication mode.

The control programs and data relating to the partial change of machinery are preferably sent from the center server when the power of the machinery is turned off.

BRIEF DESCRIPTION OF DRAWINGS

FIG. 8 is a flow chart of a third example of a function changing process by a function changing system according to the present invention.

BEST MODE FOR CARRYING OUT THE INVENTION

Next, preferred embodiments of the present invention will be explained with reference to the attached drawings.

Figure 1:
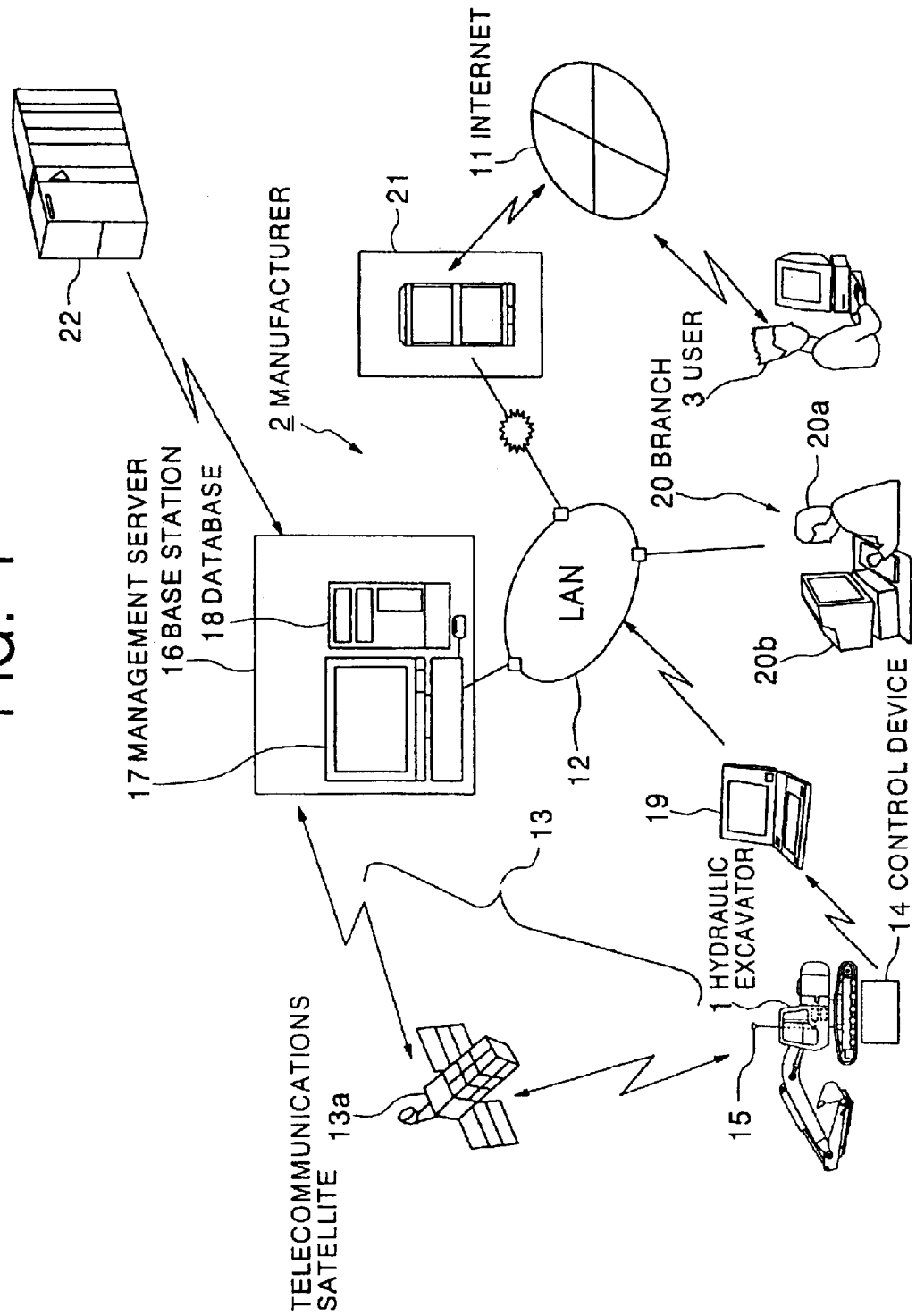
FIG. 1 is a view of the overall system configuration to which the function changing system of machinery according to the present invention is applied.

FIG. 1 schematically shows the configuration of the overall system forming the foundation for the function changing system of machinery according to the present invention. In this embodiment, the example of a hydraulic excavator is shown as the machinery. As elements forming this overall system, a manufacturer 2 making and selling the hydraulic excavator 1 and a user 3 using the hydraulic excavator 1 are shown.

Figure 2:
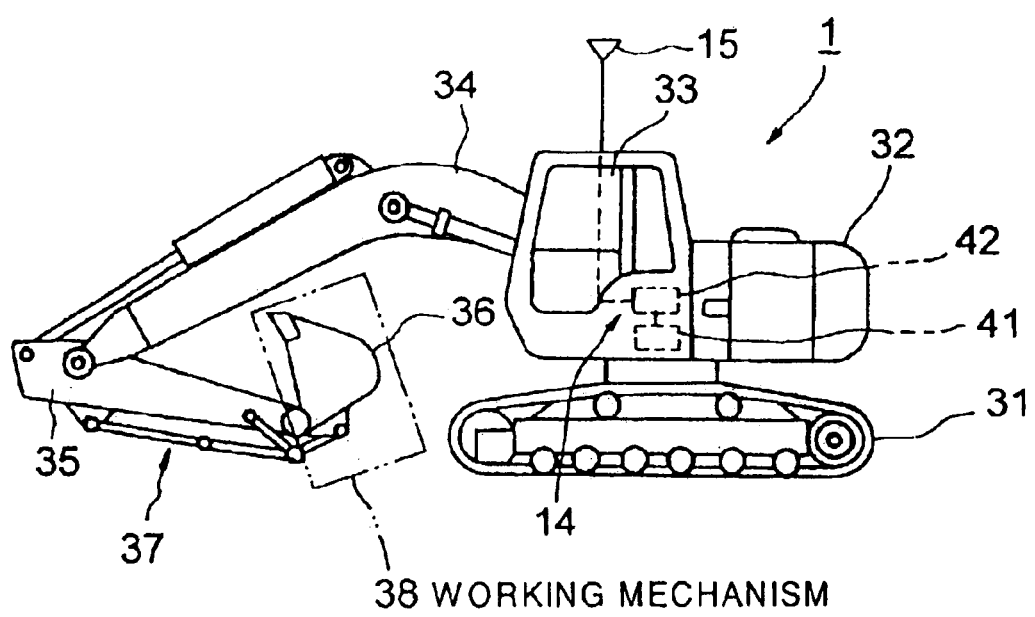
FIG. 2 is a side view of a hydraulic excavator as an example of machinery in which the function changing system according to the present invention is mounted.

In the above overall system, the hydraulic excavator 1 is deployed at a construction site or its vicinity. The manufacturer 2 and user 3 are located at positions spatially or geographically separated from the hydraulic excavator 1. In this overall system, IT (information technology) is actively used for connecting the hydraulic excavator 1, the manufacturer 2, and the user 3. The Internet 11, an in-house LAN 12, and a communications line 13 using a telecommunications satellite 13a are provided. In the hydraulic excavator 1, a control unit 14 comprised by a computer and a communications device including an antenna 15 are provided. In the configuration of this embodiment, as shown in FIG. 2, the communications device is included in the control unit 14.

In the manufacturer 2, a base station 16 is provided. This base station 16 has a management server 17 and database 18 arranged in it. The management server is positioned at the center of this system and functions as the center server. The control device 14 of the hydraulic excavator 1 deployed at the construction site and the base station 16 of the manufacturer 2 are connected to enable regular or irregular transfer of the necessary information (or data) through a download using a laptop computer 19 used by the service manager and the in-house LAN 12 or through the communications line 13. The information occurring at the hydraulic excavator 1 is all sent to the management server 17 of the base station 16 where it is processed and stored. The management server 17 transmits information as required for information sent from the hydraulic excavator 1. The data on the operating state or set state of the hydraulic excavator 1 is stored and managed in the database 18. Further, required information is sent at a suitable timing by a one-way mode from the management server 17 to the hydraulic excavator 1. Such one-way mode communication is for example performed when setting an upgraded program and changing settings of parameters.

The manufacturer 2 is connected with a branch 20 through the in-house LAN 12. Therefore, a sales manager or service manager 20a in the branch 20 can access the management server 17 and database 18 using an input terminal 20b deployed there and can search for, extract, and use data required in work regarding troubleshooting or quality assurance information. Further, the manufacturer 2 is provided with an external house server 21 connected to the in-house LAN 12. It can use this external house server 21 to provide necessary information to the user 3 through the Internet 11 and make various proposals relating to the method of use and maintenance of the hydraulic excavator. Note that the management server 17 of the base station 16 is connected to a computer 22 storing separately provided test data (repair and inspection information and part change information). The data stored in the computer 22 is also suitably downloaded to the management server 17 and stored in the database 18.

In the above configuration, instead of the manufacturer 2, another company may also operate the base station 16 provided with the management server 17 and the database 18. As such a company, there are dealers, rental companies, leasing companies, used machinery sales and management companies, etc.

FIG. 2 shows enlarged a side view of the above hydraulic excavator 1. The hydraulic excavator 1 is provided with an under traveling carriage 31 traveling by a hydraulic motor, a turning structure 32 at which the engine, hydraulic pump, hydraulic piping, power source battery, operator's cab 33, etc. are arranged, and a front mechanism 37 comprised of a boom 34, arm 35, and bucket 36. The bucket 36 is a working mechanism 38 and is a portion changed and modified freely at the user in accordance with the work. In this hydraulic excavator 1, for example, the above control device 14 and antenna 15 are provided at the location of the operator's cab. The control device 14 is comprised of a main controller 41 and communications device 42.

Figure 3:
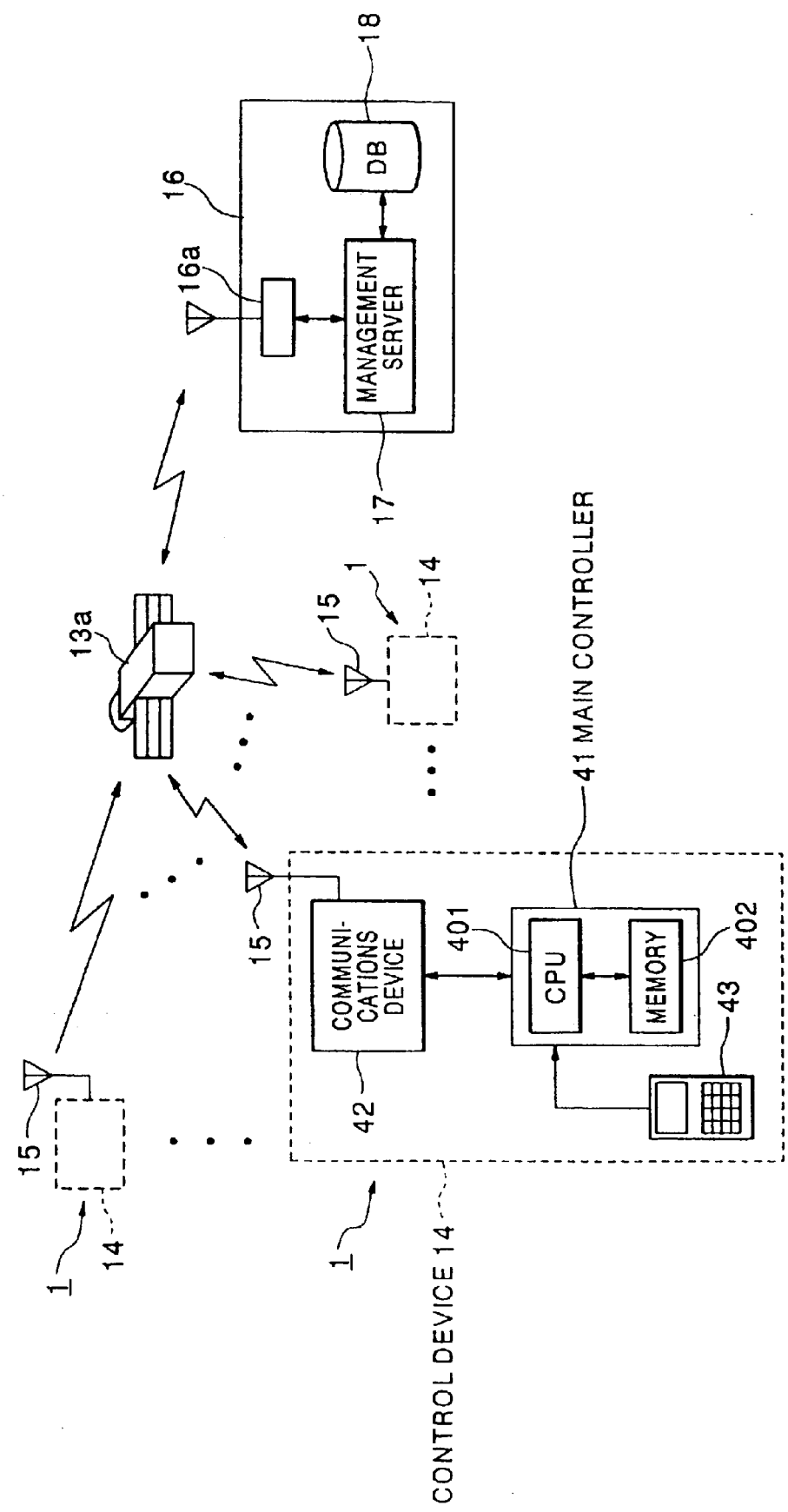
FIG. 3 is a view of the system configuration schematically showing the key parts of a function changing system according to the present invention.

FIG. 3 is a view schematically showing the relation between the hydraulic excavators 1 deployed at a large number of construction sites and the base station 16. The control device 14 of each hydraulic excavator 1 is provided with the main controller 41, communications device 42, and antenna 15. The base station 16 is provided with a communications device 16a, the management server 17, and database (DB) 18. The main controller 41 has connected to it, in accordance with need, a key pad 43 for giving information (content of alteration or change) to the main controller 41. Each of the control units 14 of the large number of hydraulic excavators 1 shown in FIG. 3 and the management server 17 of the base station 16 have formed between them the communications line by a telecommunications satellite 13a for the transfer of information.

Figure 4:
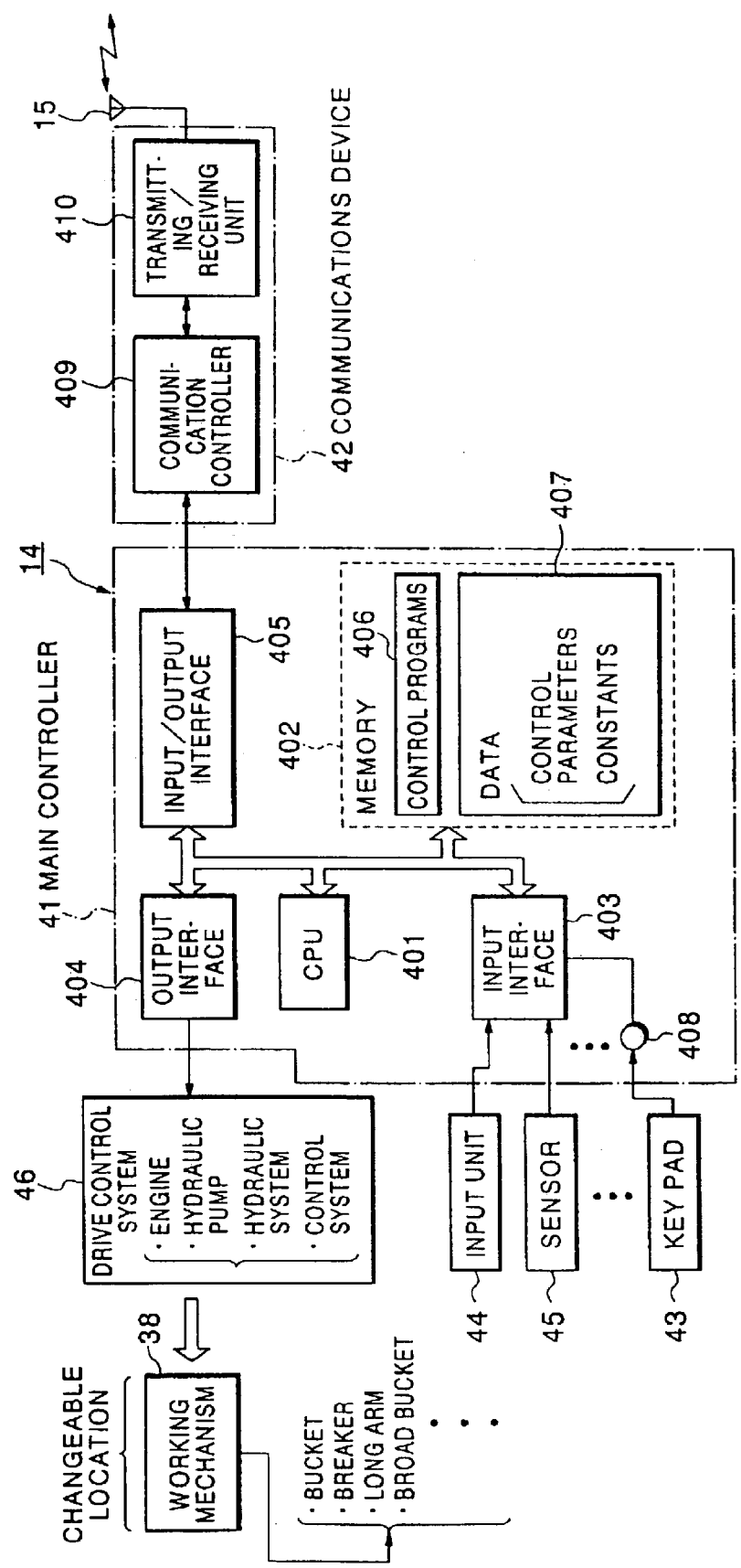
FIG. 4 is a block diagram of the internal configuration of the main controller etc. for realizing the function changing system according to the present invention and the configuration of the peripheral related parts.

Next, the internal configurations of the main controller 41 and communications device 42 and the configuration of their peripheral parts will be explained with reference to FIG. 4.

The main controller 41 is provided with a CPU (central processing unit) 401, memory 402, input interface 403, output interface 404, and input/output interface 405. The memory 402 stores a plurality of control programs 406 for various work operations and data (control parameters, constants, etc.) 407 necessary for control of the work operations. The input interface 403 receives as input signals output from an input unit 44 on an operation board arranged in the operator's cab 33 and a plurality of sensors 45 provided at different parts of the hydraulic system or electrical system etc. of the hydraulic excavator 1. Further, the input interface 403 has a connection terminal 408. The above-mentioned key pad 43 is connected in accordance with need to this connection terminal 408. It is connected to the above communications device 42 through the input/output interface 405. The communications device 42 includes a communication controller 409 and transmitting/receiving unit 410. The drive control system 46 is connected through the output interface 404. The CPU 401 gives instruction values for instructing an operation or setting values to the drive control system 46. The operation of the drive control system 46 is controlled based on these instruction values or setting values. The bucket 36 or other working mechanism 38 provided at the front end of the front mechanism 37 is made to perform the operations necessary for the work. As the working mechanism 38, there are a breaker, broad bucket, etc. in addition to the bucket. The working mechanism 38 is freely attached and detached to and from the front mechanism in accordance with the required work and used as an attachment. The working mechanism 38 is normally provided by the manufacturer as a standard attachment for each model. Further, for the working mechanism 38, in some cases parts nonstandard to the manufacturer are attached and used depending on the situation of the user. As explained above, the working mechanism 38 of the hydraulic excavator 1 is a part where change is allowed. Note that depending on the content of the work, the arm 35 is sometimes changed to a long arm of a greater length.

As examples of the control programs 406 stored in the memory 402, in accordance with the model of the hydraulic excavator 1, there are for example programs for control to prevent interference, programs for control to restrict the area of operation, programs for control of the posture of the machinery, and programs for control of the operating characteristics of the hydraulic pump (maximum flow rate of pump). Note that these programs differ partially in content in accordance with the front mechanism 37 and working mechanism 38 attached to the hydraulic excavator 1. Further, as examples of the data 407 stored in the memory 402, there are various types of dimensions of the front mechanism 37, the interference prevention region, and parameters of the control gain, pump maximum tilt angle, and engine speed.

Next, an embodiment of the function changing system of the hydraulic excavator (working machinery) will be explained based on the above configuration with reference to FIG. 5 and FIG. 6.

Figure 5:
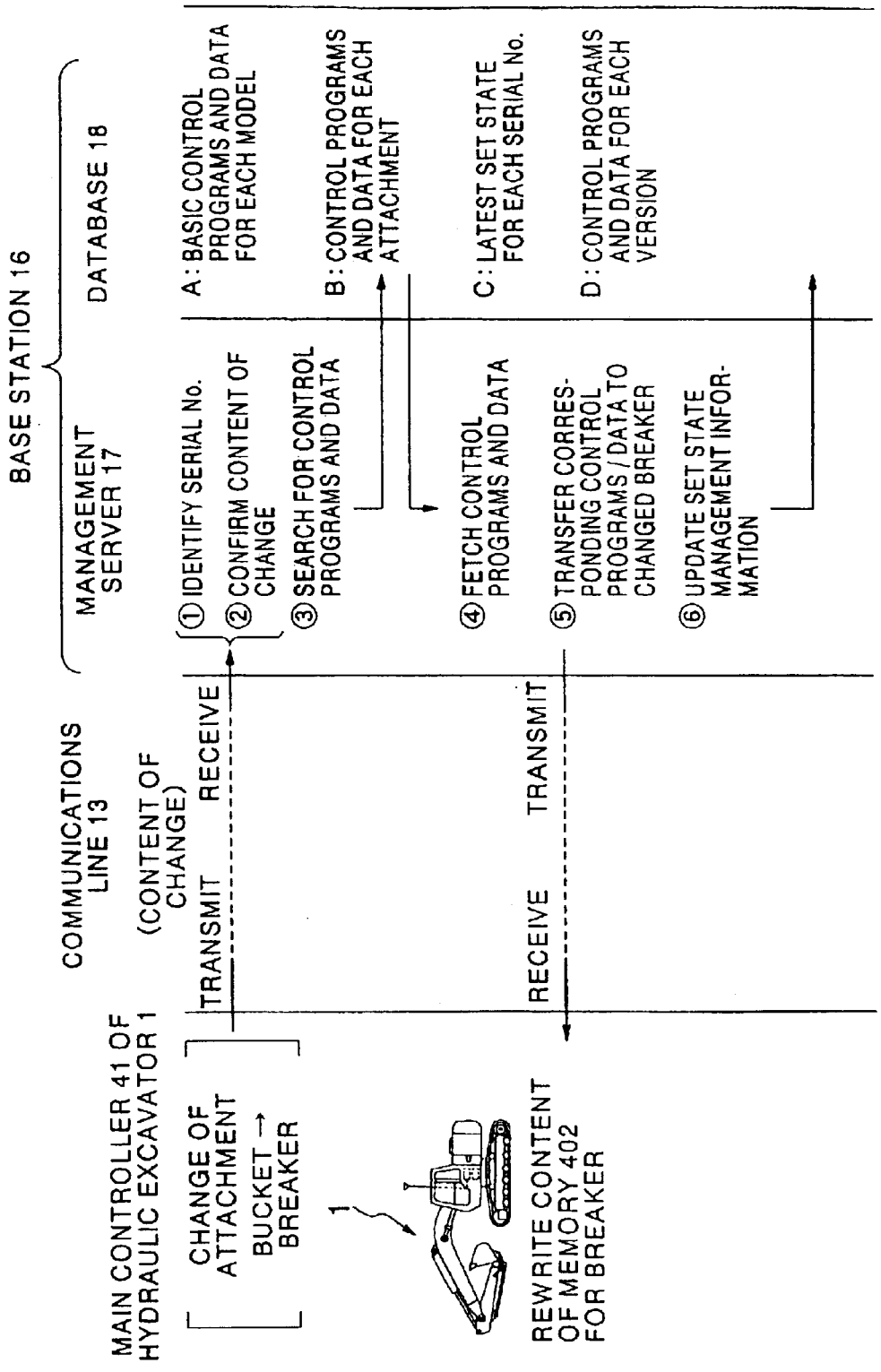
FIG. 5 is a view of the internal configuration of a management server and database of a base station in the function changing system according to the present invention.
Figure 6:
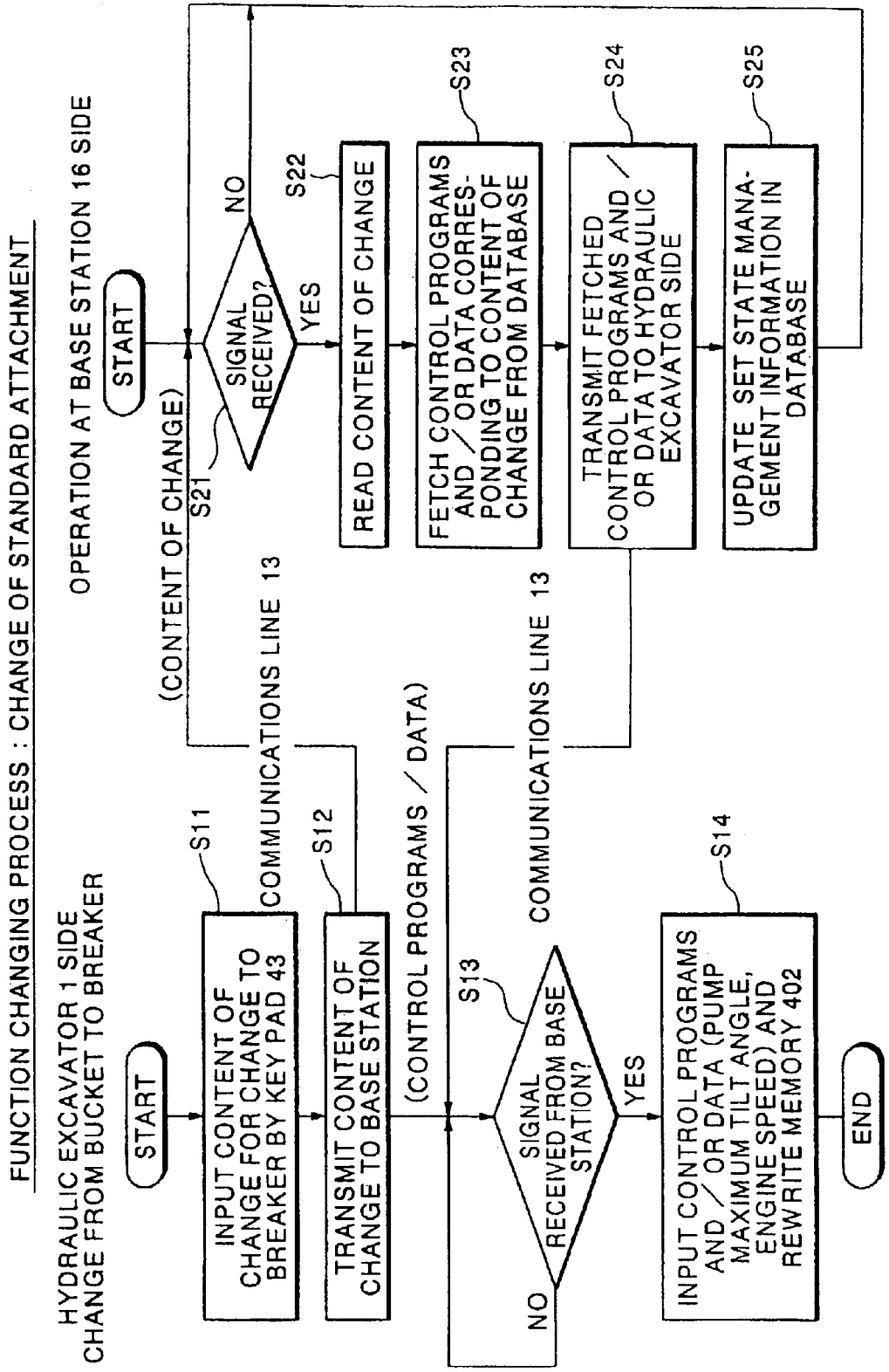
FIG. 6 is a flow chart of a first example of a function changing process by a function changing system according to the present invention.

FIG. 5 shows the relation of the transfer of information performed between the hydraulic excavator 1 and the base station 16 and the content of processing at the management server 17 and structure of the data stored by the database 18. FIG. 6 is a flow chart of the operations at the hydraulic excavator 1 side and base station 16 side and the relation of the transfer of information using the communications line 13 with the flow chart.

FIG. 5 will be explained. In the hydraulic excavator 1, changes are made at the construction site to the attachment, that is, the working mechanism 38, in accordance with the situation of the user. In this example, the normal bucket is changed to a breaker. The content of this change is input by the operator of the hydraulic excavator 1 by connecting the key pad 43 to the main controller 41 and operating the key pad 43. The CPU 401 receives the input of the content of the change and transmits the content of change to the base station 16 side through the input/output interface 405 and communications device 42 using a two-way communications line 13. The database 18 of the base station 16 stores and manages in advance at least the basic control programs and data (A) for each model, the control programs and data (B) for each attachment, the latest set state (C) for each serial number, and the control programs and data (D) for each version. The data stored in the database 18 is given a structure to have a certain relationship. When the management server 17 receives information of the content of change from the hydraulic excavator 1 side, it performs the following processing. First, it identifies the serial number of the hydraulic excavator which sent the content of change (①). Next, it confirms the content of change (②). After confirming the content of change, it searches for the control programs and data corresponding to the newly added breaker (③). It then extracts the control programs and/or data corresponding to the breaker (if existing, both) from the database 18 (④). It then sends the control programs/data corresponding to the breaker through the communications line 18 so as to return them to the hydraulic excavator 1 side (⑤). When receiving the control programs/data sent from the base station 16, the main controller 41 of the hydraulic excavator 1 rewrites the content of the memory 402 to the content to be used for the breaker. On the other hand, the management server 17 of the base station 16 updates the management information of the set state of the hydraulic excavator 1 in the database 18 (⑥).

Next, FIG. 6 will be explained. The process shown in FIG. 6 expresses the process shown in FIG. 5 in the form of a flow chart. First, the initial operation is started at the hydraulic excavator 1 side. The operator operates the key pad 43 to input the content of change for the change to the breaker (step S11). The input content of change is then sent through the communications line 13 to the base station 16 (step S12). The base station 16 continually judges if content has been received (step S21). If receiving transmission from the hydraulic excavator 16, it judges that "a signal has been received" and reads in the content of change (step S22). Next, the control programs and/or data corresponding to the content of change are fetched from the database 18 (step S23). The fetched control programs and/or data are sent through the communications line 13 to the hydraulic excavator 1 side (step S24). After this, the base station 16 side updates the set state management information in the database 18 (step S25). On the other hand, the hydraulic excavator 1 side judges after the above step S12 if a signal continues to be received from the base station 16 (step S13). If judging that it is transmitted from the base station and received, step S14 is executed. At step S14, the control programs and/or data (pump maximum tilt angle, engine speed, etc.) sent from the base station 16 side are input and the stored content of the memory 402 is rewritten.

According to the above function change process, when changing the attachment (working mechanism 38) provided at the front end of the front mechanism 37 from the bucket 36 to the standard breaker, since it is possible to utilize two-way communication with the base station 16 through a telecommunications satellite or other communications line 13 to provide control programs/data corresponding to the changed breaker to the memory 402 of the main controller 41, it is possible to instantly change the functions of the hydraulic excavator 1 and improve the work capability with a high flexibility in accordance with the work situation at the user side. Further, the information on the set state relating to the operation of the hydraulic excavator 1 is managed by updating the content of the database 18 each time the management server 17 of the base station 16 receives the transmission of a change of content and makes a necessary response.

In the present embodiment, the breaker was set by the key pad 43, but it is also possible to provide a tag having a memory function at the breaker and automatically set the parameters by connecting this tag to the controller 41. It is also possible to use a bar code or IC card etc.

Figure 7:
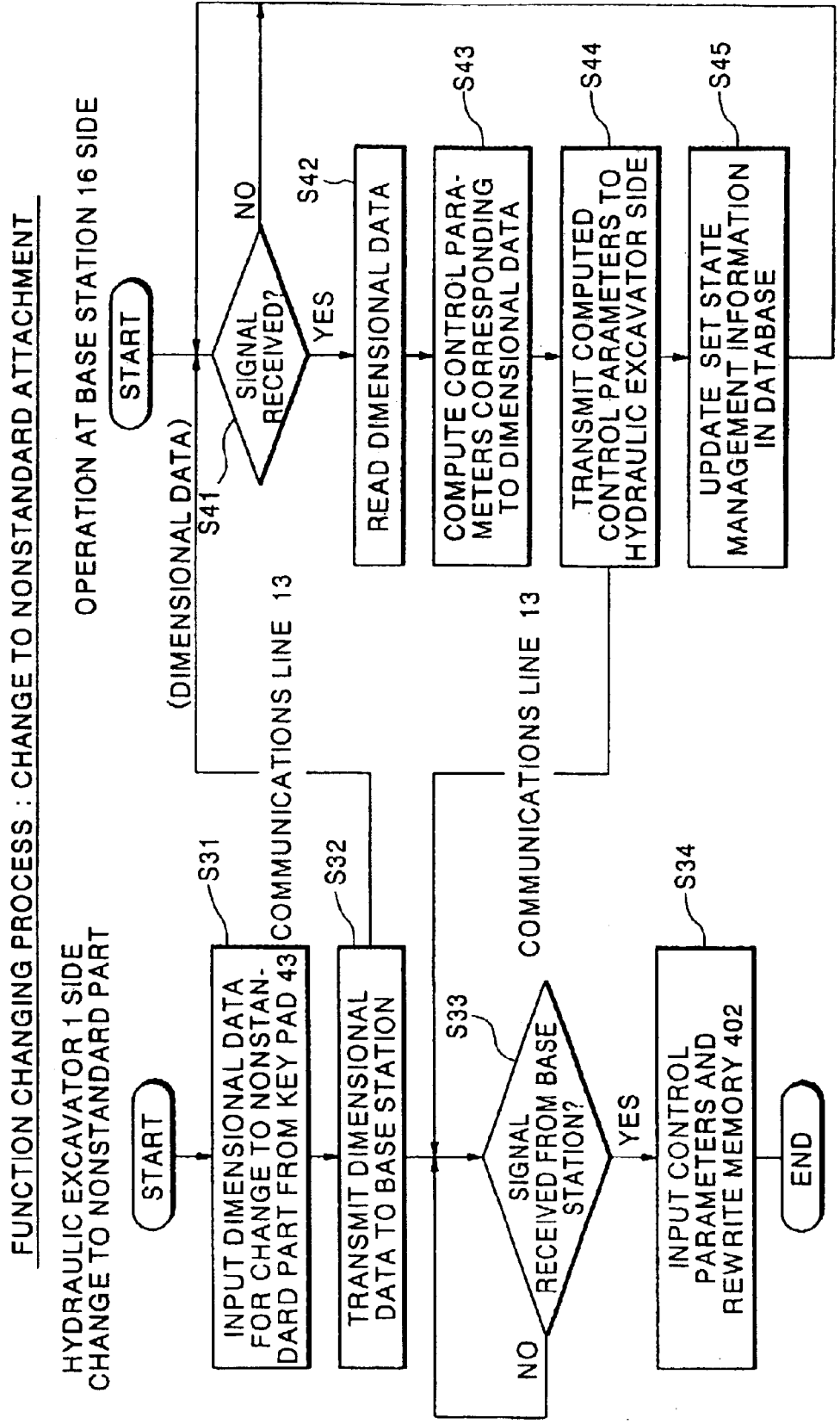
FIG. 7 is a flow chart of a second example of a function changing process by a function changing system according to the present invention.

Next, another embodiment of a function changing process will be explained with reference to the flow chart shown in FIG. 7. In this function changing process, the working mechanism 38 of the hydraulic excavator 1 is changed from the bucket 36 to a nonstandard part. In this flow chart as well, in the same way as the flow chart shown in FIG. 6, the operation at the hydraulic excavator 1 side and the operation at the base station 16 side will be shown. In FIG. 7, first, at the hydraulic excavator 1 side, the operator operates the key pad 43 and inputs the content of change, that is, the dimensional data, for the change to the nonstandard part (step S31). The input dimensional data is transmitted through the communications line 13 to the base station 16 (step S32). The base station 16 is constantly judging if there is a signal received (step S41). When receiving a transmission from the hydraulic excavator 1, it judges there is a signal received and reads the dimensional data (step S42). Next, it computes the control parameters corresponding to the dimensional data (step S43). The calculated control parameters are transmitted through the communications line 13 to the hydraulic excavator 1 side (step S44). Next, the base station 16 side updates the set state management information at the database 18 (step S45). On the other hand, the hydraulic excavator 1 side judges if a signal has continued to be received from the base station 16 after the above step S32 (step S33). If judging that there has been a transmission from the base station and a signal has been received, step S34 is executed. At step S34, control parameters sent from the base station 16 side are input and the stored content of the memory 402 is rewritten.

According to the above function changing process, when changing the attachment (working mechanism 38) provided at the front end of the front mechanism 37 from the bucket 36 to a nonstandard attachment, since it is possible to use two-way communication by a telecommunications satellite or other communications line 13 with the base station 16 to load control parameters corresponding to the changed nonstandard attachment in the memory 402 of the main controller 41, it is possible to immediately change the functions of the hydraulic excavator 1 and improve the work capability with a high flexibility corresponding to the work situation of the user side. Further, the information on the set states relating to the operation of the hydraulic excavator 1 is managed by updating the content of the database 18 each time the management server 17 of the base station 16 receives the transmission of a change of content and makes a necessary response.

Next, another embodiment of a function changing process will be explained with reference to the flow chart shown in FIG. 8. In this function changing process, the control programs 406 stored in the memory 402 of the hydraulic excavator 1 are changed to change the functions of the hydraulic excavator 1 based on a positive operation on the hydraulic excavator from the base station 16 side. This is communication for changing the functions by a one-way mode from the base station 16 to the hydraulic excavator 1. As examples of the control programs, there are for example hydraulic system control or posture control of the hydraulic excavator 1. The function changing process is performed when upgrading the control system or setting new parameters. This function changing process is executed when the operation of the hydraulic excavator 1 is stopped. As such a case, there are for example the daytime when the operator is near the hydraulic excavator or night time when no work is performed at all.

In FIG. 8, step S51 means that normal control is being executed at the hydraulic excavator 1 side. At the next step, whether the power input key is in the off position or not is constantly judged (step S52). When it is judged at the judgement step S52 that the key is at the off position, the "key off" state is transmitted through the communications line 13 to the base station 16 (step S53). The base station 16 constantly judges if the key is at the off position at the hydraulic excavator 1 at the judgement step S61. At the next judgement step S62, it reads the set state management information relating to the version in the database 18 and judges if the control programs need to be upgraded. When the control programs do not need to be upgraded, an end signal is transmitted through the communications line 13 (step S63). When the hydraulic excavator 1 receives the end signal, it judges this at the judgement step S54 and sets the end state. When judging that the process is not ended at the judgement step S54, it maintains a standby state. When a search is conducted with the database 18 at the judgement step S62 of the base station 16 and it is judged that the programs need to be upgraded, the control programs to be upgraded to are transmitted to the hydraulic excavator 1 side through the communications line 3 (step S64). On the other hand, the main controller 41 of the hydraulic excavator 1 receives the upgraded control programs sent from the base station 16 and rewrites the content of the control program 406 of the memory 402 (step S55). Further, it transmits an end signal through the communications line 13 to the base station 16 (step S56). When the management server 17 of the base station 16 receives the transmission of the end signal, the base station 16 rewrites the set state management information relating to the version in the database 18 (step S65).

According to the above function changing process, when the control programs have to be upgraded, this is judged at the base station side and the communications line 13 is used to rewrite the control programs stored in the memory of the hydraulic excavator 1 conditional on the key of the hydraulic excavator 1 being in the off position. As an actual configuration, when the hydraulic excavator 1 side receives a transmission signal from the base station, a lamp on the control panel provided in the operator's cab of the hydraulic excavator 1 lights up to notify this to the operator. The operator then presses a switch for a change of the control programs. Note that when upgrading the programs during the night time, together with the condition of the key of the hydraulic excavator 1 being in the off position, there is the condition of notification of the time of a clock confirming that it is a night time period. Further, during the night time, often the operator is not present. In such a case, a means for notifying a change of the programs to the operator before the next start of work of the hydraulic excavator is provided.

As explained above, the rewriting of the control programs for upgrade by the one-way mode from the base station side to the hydraulic excavator has the advantages that there is no need like in the past for a service worker to bring floppy disks to the site and rewrite the programs for each hydraulic excavator and therefore the operation is not troublesome.

Further, it is possible to prevent service workers from having to manage a large number of machines and serial numbers for which upgrades end up being forgotten arising.

In the explanation of the above embodiments, the explanation was given of an example of application of the function changing system to a hydraulic excavator, but the machinery is not limited to hydraulic excavators. Further, when changing the working mechanism (attachment), it is possible to immediately and freely change the control programs and/or data provided in the main controller in accordance with the content of the change. The degree of freedom is extremely high.

As clear from the above explanation, according to the present invention, in a construction machine such as a hydraulic excavator, when for example changing the attachment, it is possible to transfer information with the management server of the base station using a communications line and rewrite the control programs or data stored in the storage unit so as to enable work suited for the changed part, improve performance of the machinery, and improve flexibility.

INDUSTRIAL APPLICABILITY

When for example changing the front or attachment, the hydraulic excavator etc. transfers information with the center server of the base station to rewrite the control programs or data stored in the storage unit of the control unit of the hydraulic excavator and be able to perform work suitable to the changed front etc. It is possible to change programs or data for upgrades and to change settings of parameters without trouble.

What is claimed is:

1. A function changing system of construction machinery comprised of:

construction machinery deployed at a construction site and provided with a rewritable storage unit storing control programs or control programs and data data required for control of work operation, a control unit for reading out at least control programs from the storage unit to execute the work operation, and a first communications device, and a base station provided with a second communications device, a center server for identifying a serial number of said construction machinery and transferring information with said control unit, and a database managed by said center server and storing basic control programs and data for each model of construction machinery and control programs and data for operation of said construction machinery; wherein said control unit of said construction machinery and said center server of said base station transfer information by said first and second communications devices and a communications line;

when a working mechanism part of said construction machinery is changed, a content of the change is given to said control unit and sent by said control unit to said center server of said base station;

when receiving said content of the change, said center server transmits control programs or data or control programs and data corresponding to said content of change to said control unit of said construction machinery; and when receiving said control programs or data or control programs and data, said control unit rewrites the stored content of said storage unit by the received content.

2. A function changing system of construction machinery as set forth in claim 1, wherein said database of said base station stores standard basic control programs and data for each model.

3. A function changing system of construction machinery as set forth in claim 1, wherein a large number of said construction machinery is deployed at different sites and said database of said base station stores standard control programs and data for each serial number of all of said construction machinery.

4. A function changing system of construction machinery as set forth in claim 1, wherein when a nonstandard attachment as said working mechanism part is installed during a partial change of said construction machinery, dimensional data of said attachment is sent from said construction machinery side to said center server side;

said center server is provided with a processor unit and, when receiving said dimensional data, uses the dimensional data to prepare parameter data at said processor unit and transmits that parameter data to said control unit of said construction machinery; and when receiving said parameter data, said control unit rewrites the stored content of said storage unit with the received content.

5. A function changing system of construction machinery as set forth in claim 1, wherein said change of said working mechanism part of said construction machinery includes a change of control programs stored in said storage unit and is performed when said construction machinery is not operating.

6. A function changing system of construction machinery as set forth in claim 1, wherein a key pad is used when giving the content of change to said control unit of said construction machinery.

7. A base station for managing individually or all together the work capabilities of a large number of construction machinery deployed at different construction sites, said base station comprising:

a base station communications device for communicating with a communications device provided at each of the large number of construction machinery;

a center server for identifying a serial number of each of said large number of construction machinery and transferring information with a control unit of each of said large number of construction machinery through said communications devices; and a database managed by said center server and storing basic control programs and data for each model of said construction machinery and control programs and data for operating said construction machinery;

wherein said center server receives transmission of a signal relating to a change of a working mechanism of a construction machinery from said construction machinery, prepares parameter data corresponding to the changed working mechanism, and transmits the parameter data to said control unit of said construction machinery.

8. A base station as set forth in claim 7, wherein said database stores standard basic control programs and data for each model.

9. A base station as set forth in claim 7, wherein said database stores the standard control programs and data for each serial number of each of said large number of construction machinery.

10. A base station as set forth in claim 7, wherein the control programs and data relating to the change of said working mechanism of said construction machinery are sent from said center server when said construction machinery is not operating.

11. A base station as set forth in claim 7, wherein said center server has a database for managing a set state of control programs for every serial number.

* * * * *